F. SCHULTHEISS.
LEAKAGE REDUCING DEVICE.
APPLICATION FILED MAY 5, 1911.
1,076,457.
Patented Oct. 21, 1913.
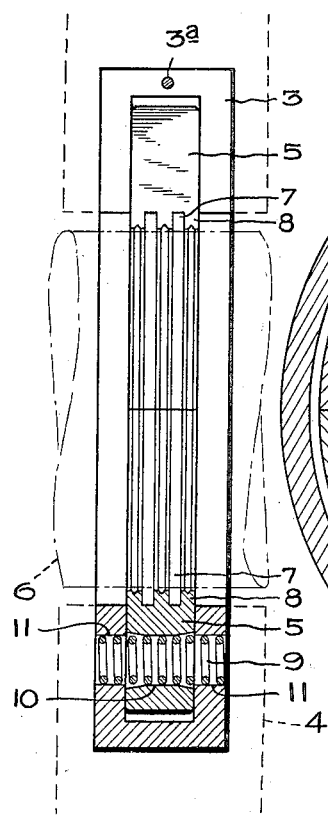
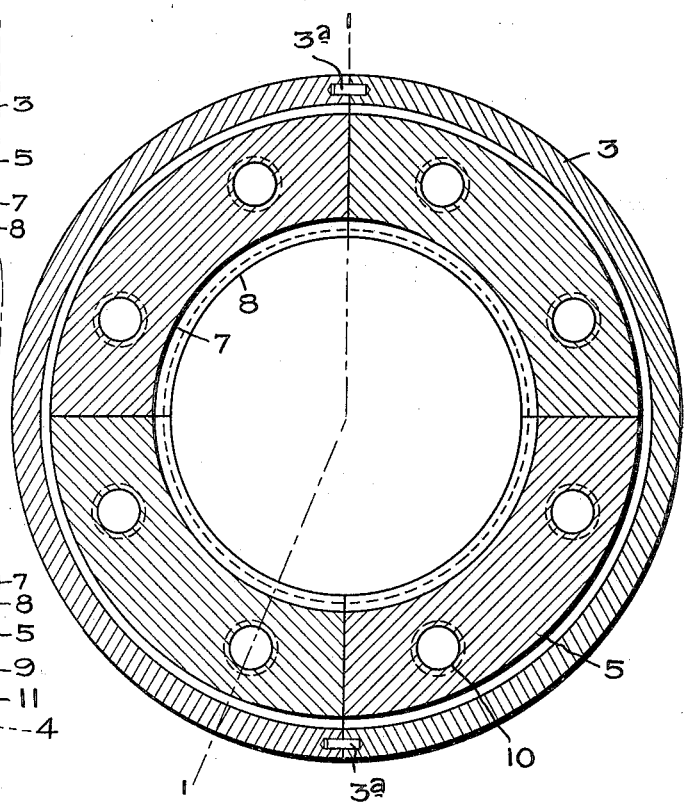
Witnesses:
Marcus L. Byng.
J. Ellis Glen
Inventor,
Franz Schultheiss,
by Albert H. Davis
Att'y.

UNITED STATES PATENT OFFICE.

FRANZ SCHULTHEISS, OF CHARLOTTENBURG, GERMANY, ASSIGNOR TO GENERAL ELECTRIC COMPANY, A CORPORATION OF NEW YORK.

LEAKAGE-REDUCING DEVICE.

1,076,457.

Specification of Letters Patent. Patented Oct. 21, 1913.

Application filed May 5, 1911. Serial No. 625,192.

*To all whom it may concern:*

Be it known that I, FRANZ SCHULTHEISS, a subject of Herzog von Sachsen-Meiningen, residing at Charlottenburg, Germany, have invented certain new and useful Improvements in Leakage-Reducing Devices, of which the following is a specification.

The present invention relates to leakage reducing devices and more especially to those intended for use in diaphragms of elastic-fluid turbines.

The object of the invention is to provide a leakage reducing device which is effective in its action, is simple to construct and is not easily injured.

For a consideration of what I believe to be novel and my invention, attention is directed to the accompanying description and claims appended thereto.

In the accompanying drawing, which illustrates one of the embodiments of my invention, Figure 1 is a sectional view of my improved device taken on line 1—1 of Fig. 2; and Fig. 2 is a cross section of the same.

3 indicates a casing or housing which is adapted to be snugly fitted into the diaphragm 4 of a steam turbine, the said diaphragm being subjected to different pressures on opposite sides. The diaphragm may advantageously be made in two pieces.

Since my invention is particularly useful for steam turbines, it will be described in that connection, although it is of wide application.

The housing is made in two or more parts, which parts are united by dowel pins 3ª. Located within the housing is a leakage reducing means comprising a ring 5 having a central bore through which the shaft 6, shown in dotted lines, extends. The bore of the ring is provided with grooves 7 and projections 8, forming what is commonly known as a labyrinth. The diameter of the bore is made only slightly greater than that of the shaft so as to reduce the leakage as much as possible. The alternate arrangement of grooves and projections also assists to reduce leakage. The sides of the ring make a sliding fit with the inner side walls of the housing. They should fit snugly when the parts are hot but should also be capable of sliding freely so as to move within the housing when for any reason the shaft whips or temporarily gets out of line. This action of the shaft sometimes takes place in starting up, and also under great variations in load.

In order that the ring may be returned to its initial position after being displaced by the shaft, springs 9 are provided. These springs may be of any suitable character. As shown, they are made in coil form and extend axially through holes 10 in the ring and enter and are held by the walls of openings or recesses 11 in the housing. The holes 10 in the ring are chamfered or made slightly conical on each side of a central plane perpendicular to the shaft so that the ring as a whole may move in a direction perpendicular to the shaft. The holes or recesses in the housing may also be chamfered slightly for the same reason. It will thus appear that each spring engages the ring at or about its central part only, and hence the ring as a whole is spring supported and is free to move slightly in all directions with respect to the shaft. The number of these springs will naturally be determined by the weight and size of the parts. Owing to the formation of the springs and to their position and relation to the ring, it will be seen that they also serve to center said ring as soon as the pressure or force exerted by the shaft is removed. I find it desirable in most cases to make the ring in segments, four being shown as an illustration. The segments abut one another and are therefore arch bound when in their normal position. A deflection of the shaft from any cause may then cause only one segment to move or it may cause more to move depending upon the character and magnitude of the shaft deflection. In any event as soon as the shaft pressure is removed from a given segment it will return to its normal position due to the action of its springs.

Owing to the construction and arrangement of the springs they tend to prevent the segments from moving inward beyond their proper position just as they tend to restrict outward movement. In other words, movement of a ring segment from its initial position, either radially outwardly or inwardly or circumferentially, is resisted by said springs, and if such movement does take place the springs restore each segment to its proper position. This self centering of the ring is a very desirable feature since it tends to reduce leakage and increases the life of the ring by reducing wear when contact is made with the shaft. Another advantage resides in the fact that the springs are protected by the ring on the one hand and by the housing on the other. Further, the springs are connected without tension to the ring segments.

By locating the springs partly in the housing and partly in the ring the axial length of the leakage device as a whole is reduced to a minimum. By dispensing with peripheral springs the diameter of the housing may be materially reduced.

My invention has been shown in connection with a horizontal shaft machine, but it can be used in vertical shaft machines.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a device of the character described, the combination of a housing having recesses in its walls, a leakage reducing ring mounted in the housing, and springs that pass through the ring and enter said recesses and support the ring.

2. In a device of the character described, the combination of a housing having recesses in its walls, a leakage reducing ring mounted within the housing and free to slide therein, and a plurality of axially extending coiled springs for supporting the ring that are located in the ring and are seated in the walls of the housing.

3. In a device of the character described, the combination of a housing, a leakage reducing ring mounted in the housing, and springs by which the weight of the ring is entirely supported, said springs being the sole means for centering the ring and also for preventing it from rotating.

4. In a device of the character described, the combination of a housing, a segmental leakage reducing ring mounted to slide therein, said housing and ring being provided with registering openings, and springs located in said openings which form the sole support for the segments of the ring.

5. In a device of the character described, the combination of a housing having parallel walls, a segmental ring mounted therein, and a pair of springs which extends through each ring segment into the walls of the housing, there being a clearance around each spring on opposite sides of the segment to permit the segment to move slightly from its normal position.

6. In a device of the character described, the combination of a housing, a leakage reducing ring mounted in the housing and provided with a plurality of openings extending through the ring and having their axes parallel to the axis of the ring, there being alined openings in the housing at opposite sides of the ring, and springs arranged in said openings for supporting the ring and holding it against rotation that have their ends seated in the openings in the housing and their middle portions in lateral engagement with the walls of the openings in the ring.

In witness whereof, I have hereunto set my hand this 20th day of April, 1911.

FRANZ SCHULTHEISS.

Witnesses:
WOLDEMAR HAUPT,
HENRY HASPER.